United States Patent [19]
Cooper

[11] 3,989,945
[45] Nov. 2, 1976

[54] METHOD FOR DETERMINING THE CONCENTRATION OF FISSION PRODUCTS IN A REACTOR COOLANT

[75] Inventor: Martin H. Cooper, Monroeville, Pa.

[73] Assignee: Westinghouse Electric Corporation, Pittsburgh, Pa.

[22] Filed: June 14, 1974

[21] Appl. No.: 479,387

[52] U.S. Cl. .......................... 250/304; 176/19 LD; 250/303; 250/391
[51] Int. Cl.² ........................................ G01N 31/06
[58] Field of Search ........................... 250/390–392, 250/303, 304; 176/19 LD

[56] References Cited
UNITED STATES PATENTS

| | | | |
|---|---|---|---|
| 3,178,355 | 4/1965 | Jacobs | 176/19 LD |
| 3,733,249 | 5/1973 | Miller et al. | 176/19 LD |
| 3,746,614 | 7/1973 | Meyer et al. | 176/19 LD |

*Primary Examiner*—Archie R. Borchelt
*Attorney, Agent, or Firm*—E. L. Levine

[57] ABSTRACT

A method is disclosed for determining the concentration of fission products in the reactor coolant of a liquid metal cooled nuclear reactor. Reactor coolant is bypassed at constant temperatures and constant velocity through a flow sampling system containing a sampling tube. After a period of time, the sampling tube is isolated and removed from the bypass system; the liquid metal coolant is removed from the tube; and, the radionuclides deposited on the sampling tube are measured by gamma spectroscopy. The concentration of fission products in the reactor coolant is then determined from the measured radioactivity of the deposited nuclides.

3 Claims, 1 Drawing Figure

METHOD FOR DETERMINING THE CONCENTRATION OF FISSION PRODUCTS IN A REACTOR COOLANT

CROSS REFERENCE TO RELATED APPLICATION

This application is related to a patent application entitled "Method for Detecting and Locating Defective Fuel Elements in a Liquid Metal Cooled Nuclear Reactor" by M. H. Cooper, Ser. No. 472,752, filed May 23, 1974.

BACKGROUND OF THE INVENTION

1. Field of the Invention:

This invention relates generally to fission product contamination of a reactor coolant, and more particularly to a method for determining the concentration of fission products in the reactor coolant of a liquid metal cooled nuclear reactor.

2. Description of the Prior Art:

In general, a nuclear reactor produces heat by fissioning of nuclear materials which are fabricated into fuel elements and assembled within a nuclear core. In commercial nuclear reactors, the heat produced thereby is used to generate electricity. A liquid metal cooled nuclear reactor is an example of such a commercial reactor.

In this type of reactor, a reactor coolant such as liquid sodium, circulates through a primary heat exchange system whereby the nuclear heat is removed from the core and transferred to a secondary heat exchange system. It is within the secondary heat exchange system that the heat is transferred into steam which is ultimately used to generate electricity by conventional turbine-generator apparatus. The primary heat exchange system which mostly concerns this application, includes the aforementioned nuclear core, a reactor vessel for housing the core, a heat exchanger, a circulating pump, and piping interconnecting these apparatus.

In the type of nuclear reactor considered herein, the fuel elements usually comprise elongated sealed tubes or "cladding" filled with nuclear fission material, such as plutonium 239 or enriched uranium, in the form of cylindrical pellets. Hence, fission products and fission gases which are produced as a result of the nuclear reaction, during reactor operation remained contained within the sealed cladding. There is the possibility, however, that a breach of the cladding may occur and allow these fission products to escape into the reactor coolant flowing past the fuel elements. As long as the concentration of these fission products in the reactor coolant remains low, no problem arises. But, should a relatively large number of fuel elements fail, which is highly unlikely, the fission product contamination of the reactor coolant could achieve harmful levels. High concentrations of fission products cause the reactor coolant itself to become radioactive. And, because the fission products readily precipitate out of solution they cause the heat exchanger, the circulating pump, the interconnecting piping and other equipment to become radioactive. This, of course, has the effect of substantially interfering with personnel access to these components for such necessary tasks as equipment repair and maintenance.

In the prior art, a relatively simple and direct method of determining fission product contamination of the reactor coolant has been utilized. Namely, the level of radioactivity of the reactor coolant was measured by a gamma spectroscopy. The determination of the level of fission product contamination was necessarily limited, therefore, to relatively low sensitivities. Presently, the sensitivity of the prior art methods limits the detection of nuclide activities to a level of $10^{-5}$ microcuries per mililiter. As this level of radioactivity is relatively high, it only indicates that a substantial failure within the nuclear core has occurred. It does not indicate a relatively minor failure. Although it would be extremely advantageous to learn of the occurrence of a relatively minor or a less significant failure within the nuclear core, such a determination is not possible with the prior art method. Thus, there exists a continuing need to improve upon methods for determination of fission product contamination of a coolant of a nuclear reactor.

SUMMARY OF THE INVENTION

The present invention provides a method for the determination of extremely low levels of fission product contamination of a reactor coolant. The reactor coolant being tested is passed through a bypass sample tube at a constant temperature and flow rate. After sampling for a predetermined length of time, the sample tube is either drained and cooled, or isolated from the system and frozen. The sample tube is then removed for chemical analysis. Any remaining reactor coolant is removed from within the tube; and, the tube walls are treated to remove an adherent film of the reactor coolant. Radionuclides which are deposited on the walls of the tube are then removed by an acid leach and radiochemically analyzed by gamma spectroscopy. The concentration of each radionuclide in the reactor coolant is then calculated from the rate of mass transfer computed from mass transfer theory and the amount of each nuclide in the deposit. Thus, the sample tube wall acts as an integrator, permitting sensitivities of $10^3$ to $10^4$ greater than that achievable by analyzing the reactor coolant sample directly.

For a further description of a sodium cooled system which may be utilized with the method of this invention, reference may be had to the accompanying FIG. 1 which illustrates schematically a primary coolant loop of a sodium cooled reactor system including a sampling bypass loop having a removable sampling tube.

DESCRIPTION OF THE PREFERRED EMBODIMENT

Figure 1:
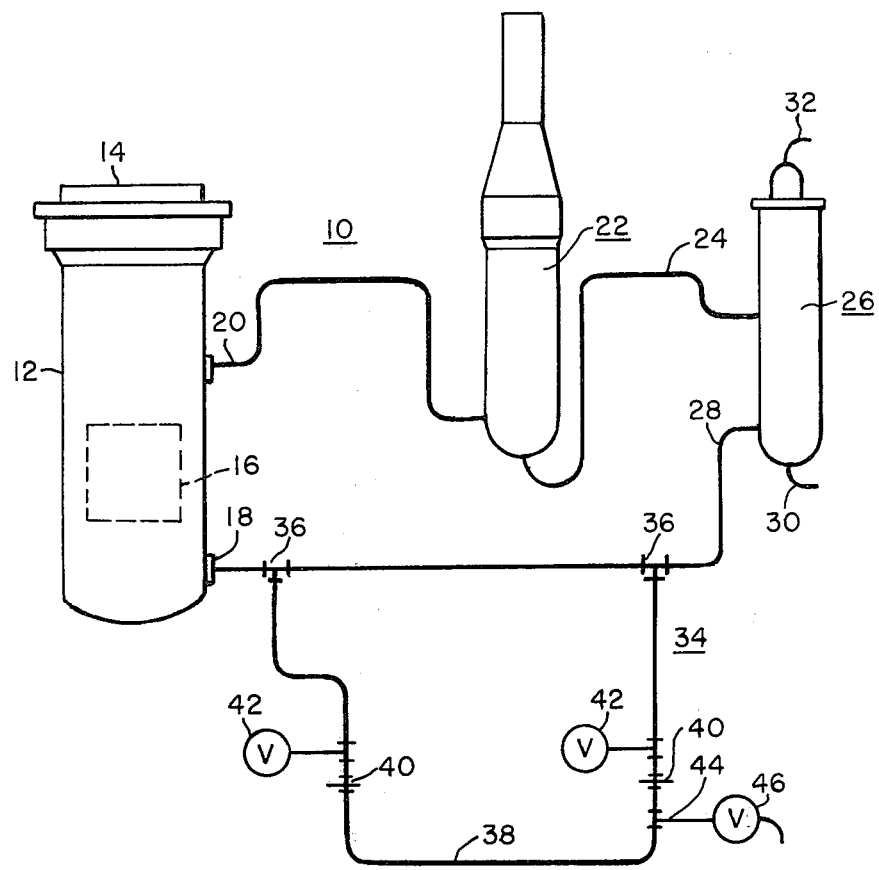

For a more detailed description of a sodium cooled breeder reactor of FIG. 1 with which the instant invention may be utilized, reference may be had to report PMC-74-01 (Conf 740116) dated April, 1974 which describes the Clinch River Breeder Reactor Project, which report is available from the U.S. Atomic Energy Commission, Technical Information Center, Oak Ridge, Tenn.

Referring to FIG. 1 and as described hereinabove, a nuclear reactor primary system 10 includes at least one coolant recirculation loop which comprises a reactor pressure vessel 12 of a well known construction which is generally cup-shaped and is enclosed by a vessel head or cover 14. Disposed in the vessel 12 and supported therein by means well known in the art is a reactor core illustrated schematically and depicted by the dashed lines 16. The reactor core 16 is formed by a plurality of assemblies of fuel elements, not shown, which include fissionable material such as isotopes of uranium and which undergo a controlled nuclear chain reaction to produce heat which is removed from the core by a suitable reactor coolant, which in this example comprises sodium maintained in liquid form. The pressure vessel 12 includes at least one inlet nozzle 18 and at least one outlet conduit 20 to accommodate the flow of liquid sodium into and out of the vessel 12 and through the reactor core. Conduit 20 is connected to the inlet of a circulating pump which facilitates the flow of liquid sodium coolant through the reactor vessel 12 toward pump 22 through conduit 20 and then through a pump outlet conduit 24 which is flow coupled to the inlet of the primary coolant intermediate heat exchanger 26 and thence through an outlet conduit 28 from heat exchanger 26, with conduit 28 being connected to inlet nozzle 18 of vessel 12. Intermediate heat exchanger 26 may be of any suitable construction well known in the art and serves to circulate the coolant in primary system 10 in heat exchange relationship with secondary system coolant flowing through heat exchanger 26 between secondary system inlet and outlet conduits 30 and 32. Primary and secondary coolant flowing through intermediate heat exchanger 26 are maintained out of physical contact by suitable well known means such as by flowing primary system coolant through the interior of a plurality of tubes and by flowing the secondary system coolant along the exterior of such tubes.

In this example, a bypass sampling system designated generally by reference character 34 is connected across spaced segments of outlet conduit 28. In furtherance of this purpose, conduit 28 is provided with a pair of spaced coupling members 36 which flow-couple bypass system 34 to line 28. Coupling members 36 may be of any well known construction which prevent any leakages at the junctions between conduit 28 and bypass system 34. Bypass system 34 includes a removable sample tube 38 therein which is connected to system 34 through a pair of detachable couplings 40, which may be of any known construction such as couplings sold under the tradename "Swagelok." A pair of shut-off valves 42 are positioned adjacent each coupling 40 on the same side of the couplings as conduit 28. The valves 42 may be of any suitable design and serve to terminate any flow through bypass system 34 to facilitate the removal of sampling tube 38. Sampling tube 38 may include a drain line 44 therein having a drain valve 46 therein to facilitate removal of air or gases entrained in the sample tube.

The bypass flow system 34 is connected to a nuclear reactor for the purpose of bypassing a portion of the total reactor coolant flow from the reactor system 10 in order to determine the fission product contamination of the reactor coolant. Details of the bypass system are relatively unimportant; however, the system should be designed and arranged so that it is convenient to operate and it is somewhat accessible by reactor site personnel. Thus, the bypass system may be either remotely operated or manually operated consistent with normal reactor operating safeguards. It is also possible for the bypass system to be temporarily installed for purposes of a test rather than comprising a permanent installation. Considerations such as these applied to the design of the bypass system, are well within the state of the art to those reasonably skilled in the art and will not be further elaborated upon. The bypass system, then, is not to limit the invention, but is merely to be utilized to allow the practice of the invention.

The bypass sample system 34 is to include an isolatable and removable sample tube 38. Again, the actual design of the sample tube 38 is relatively immaterial, but consideration should be given to certain aspects which follow. The sample tube and the sample system should allow a reasonably high rate of flow therethrough, for example, 3 to 4 gals. per min. A pressure drop through the sample system of 10 to 20 psig is considered practical. An internal diameter of approximately ½ inch for the sampling tube and the lines of the system is also considered reasonable. The sample tube which, as previously noted, must be isolatable and removable, may have a length of 1 inch or more.

In the practice of the invention, the reactor coolant to be tested is caused to flow through the sampling system and tube for a measured length of time. In the example described below, this measured length of time was approximately 4 hours. Then, flow through the bypass system is stopped by means of valves 42 and the sample tube 38 is isolated. The coolant within the sample tube 38 may either be drained through line 44 and valve 46 or frozen within the tube. If the reactor coolant comprises liquid sodium, the coolant may be frozen within the tube 38 by merely allowing the coolant to cool to room temperature. The sample tube 38 is then removed for analysis. Although the reactor coolant within the sample tube is not necessary in the practice of this invention, in the interest of economy, the sample may be saved for other analyses, such as determination of the oxygen, hydrogen and carbon content. Since the sample tube and the reactor coolant therein will be radioactive, proper precautions in the handling thereof is recommended. The sample tube itself may be conveniently handled within a glove box containing an inert atmosphere. From the time the sample tube is removed from the bypass system the internal diameter of the sample tube must be adequately protected from exposure to an environment that is not inert.

Within the glove box, the reactor coolant may be melted out from within the sample tube and reserved for further analyses. The sample tube walls are then treated with an alcohol rinse in order to remove a film of the reactor coolant which will be adherent to the surfaces of the sample tube. The alcohol rinse is to be preserved and not to be discarded. The sample tube walls are then treated with a water rinse to further remove any remaining traces of the reactor coolant. The water rinse is also to be preserved and not discarded. Finally, the sample tube walls are treated with an acid leach, comprising, for example, $HNO_3$, to remove any radionuclides which are deposited on the internal walls of the sample tube. The preserved alcohol rinse, the water rinse and the acid leach are then concentrated in accordance with known chemical techniques to facilitate radiochemical analysis. The concentrated rinses are radiochemically analyzed by conventional gamma spectroscopy. In the example of the reactor utilized herein, the radionuclides deposited on the walls of the sample tube will include such fission products as $^{140}Ba$-$^{140}La$, $^{95}Zr$-$^{95}Nb$, $^{141}Ce$, $^{89}Sr$. These fission products form stable oxides or hydrides with the oxygen and hydrogen impurities present in the liquid sodium reactor coolant. Since these compounds have extremely low solubilities in the sodium, they deposit readily on surfaces within the system. Hence, these oxides or hydrides will have deposited on the internal walls of the sample tube of this invention.

It is to be observed that the practice of the invention relies in part upon the presence of oxygen and hydrogen contaminants in the reactor coolant, the affinity for the fission products to form stable oxides or hydrides with these impurities, and the extremely low solubilities of these compounds in the reactor coolant so that they deposit on surfaces in the system. That these fission products behave thusly have been found in experiments which were conducted in the discovery of this invention.

In order to aid one, who is reasonably skilled in the art, to practice this invention, the following example is given. The example explicitly illustrates the method whereby the concentration of an isotope of barium in a reactor coolant comprising liquid sodium is determined. Detection of the barium in the sodium was not possible by direct scanning of the sample of reactor coolant utilizing previously known techniques. By utilizing the method disclosed herein, however, the concentration of the barium in the sodium is capable of being determined. The table below lists a summary of the data of the example.

TABLE I

| Nuclide | | $^{133}Ba$ |
|---|---|---|
| Measured Activity: | | |
| Na (bulk) | | Not detectable |
| Alcohol rinse | wall of the sampling tube | $6.7 \times 10^{-5}$ $\mu Ci$ |
| Acid Leach | | $4.1 \times 10^{-4}$ $\mu Ci$ |
| Sampling Flow Rate | | 0.25 gpm |
| Sampling Time | | 4 hours |
| Calculated Conc. in Na | | $9.38 \times 10^{-7}$ $\mu Ci/cm^3$ |

With regard to the above data, the calculations below illustrate the analytical steps disclosed by this invention aiding in the determination of the concentration of barium in the sodium reactor coolant.

Using the data from Table I:
$^{133}Ba$ on wall = $4.77 \times 10^{-4}$ $\mu Ci$
Area of sample wall = $8.14$ $cm^2$
$\lambda^{133}Ba = 3.05 \times 10^{-9}$ $sec^{-1}$ (7.2 year half life)
let N = no. of atoms on wall $$N = \frac{\mu Ci \text{ on wall} \times 3.70 \times 10^{-4} \text{ dis/sec/}\mu Ci}{\lambda}$$

$$= \frac{4.77 \times 10^{-4} \times 3.70 \times 10^4}{3.05 \times 10^{-9}}$$

$$= 5.78 \times 10^9 \text{ atoms}$$

gm moles/cm², sec = N =
$$\frac{5.78 \times 10^9 \text{ atoms}}{6.023 \times 10^{23} \text{ atoms/gm mol} \times 8.14 \text{ cm}^2 \times 1.44 \times 10^4 \text{ sec}}$$
$$= 8.19 \times 10^{-20} \text{ gm mol/cm}^2, \text{ sec.}$$

For flow of 0.25 gpm,
$$v = 0.25 \text{ gal/min} \times \frac{1 \text{ min.}}{60 \text{ sec.}} \times 3.785 \times 10^3 \text{cm}^3/\text{gal}$$
$$= 15.77 \text{ cm}^3/\text{sec}$$
$$A_x = \frac{\pi d_t^2}{4} \times (2.54)^2 = \frac{\pi (0.402)^2}{4} \times (2.54)^2 = 0.818 \text{ cm}^2$$

$$u = \text{velocity} = \frac{15.77 \text{ cm}^3/\text{sec}}{0.818 \text{ cm}^2} = 19.27 \text{ cm/sec}$$

$$Re = \text{Reynolds No.} = \frac{du\rho}{\mu}$$

$\rho$ (density) at 920° F = 0.832 $gm/cm^3$
$\mu$ (viscosity) at 920° F = 0.240 cp = 0.00240 poise
$d = 0.402$ in $\times 2.54 = 1.02$ cm
$$Re = \frac{(1.02)(19.27)(0.832)}{0.00240} = 6,813$$

From the Chilton-Colburn analogy:
$j_D$ ($Re = 6,813$) = $4.5 \times 10^{-3}$
$$j_D = \frac{k_x (Sc)^{2/3}}{L_M}$$

$$L_M = \text{molar velocity} = \frac{5.77 \text{ cm}^3/\text{sec} \times 0.832 \text{ gm/cm}^3}{23 \text{ gm Na/gm mol} \times 0.818 \text{ cm}^2}$$
$$= 0.697 \text{ gm mol/cm}^2, \text{ sec.}$$

$$(Sc) = \frac{\mu}{\rho D}$$

$D(920° F) = 3.2 \times 10^{-5}$ (M. H. Cooper and G. R. Taylor, "Adsorption and Diffusion of $^{137m}Ba$ from Na-$^{137}Cs$ Solution", Trans. Am. Nucl. Soc., 12, pp. 57–58 (June 1969)).
$$Sc = \frac{2.40 \times 10^{-3}}{0.832 \times 3.2 \times 10^{-5}} = 90.1$$

$(Sc)^{2/3} = 20.0$ $$k_x = \frac{j_D L_M}{(Sc)^{2/3}}$$

$$K_x = \frac{(4.5 \times 10^{-3})(0.697)}{20} = 1.568 \times 10^{-4} \text{ gm mol/cm}^2, \text{ sec, mol fraction.}$$

$N = k_x \Delta X$
if we assume conc. in liquid adjacent to wall = 0 (perfect adsorption)
$N = k_x \lambda_2$
$$\lambda 2 = \frac{N}{k_x} = \frac{8.19 \times 10^{-20} \text{ gm mol/cm}^2, \text{ sec}}{1.568 \times 10^4 \text{ gm mol/cm}^2, \text{ sec, mol fraction}}$$

$$= 5.22 \times 10^{-16} \text{ mol fraction}$$

$$\text{g mol } ^{131}\text{Ba/gm Na} = \frac{5.22 \times 10^{-16}}{23 \text{ gm Na/gm mol}} = 2.27 \times 10^{-17}$$

$$\text{g mol } ^{133}\text{Ba/cm}^3\text{Na} = 2.27 \times 10^{-17} \times 0.832 \text{ gm/cm}^3$$
$$= 1.89 \times 10^{-17}$$

$$\text{atoms/cm}^3 = 1.89 \times 10^{-17} \times 6.023 \times 10^{23} = 1.138 \times 10^7 \text{ atoms/cm}^3$$

$$\mu Ci/\text{cm}^3 = \frac{\lambda N}{3.70 \times 10^4}$$

$$= \frac{(3.05 \times 10^{-9})(1.138 \times 10^7)}{3.70 \times 10^4}$$

$$= 9.38 \times 10^{-7} \, \mu Ci/\text{cm}^3$$

From the foregoing description, it is seen that this invention provides a new method for determining extremely low levels of concentrations of fission products in a reactor coolant.

Since numerous changes may be made in the abovedescribed apparatus and different embodiments of the invention may be made without departing from the spirit and scope thereof, it is intended that all the matter contained in the foregoing description shall be interpreted as illustrative and not in a limiting sense.

I claim as my invention:

1. A method for determining the concentration of fission products in a reactor coolant of a liquid metal cooled nuclear reactor, comprising the steps of:
   ducting reactor coolant through a sampling tube for a predetermined period of time at a predetermined rate of flow;
   removing the sampling tube;
   removing fission products which are adsorbed on the wall of said sample tube by acid leaching; and then,
   gamma scanning the removed fission products by gamma spectroscopic apparatus.

2. The method of claim 1, including the steps of:
   rinsing the removed sampling tube with alcohol prior to said acid leaching;
   water rinsing the removed sampling tube prior to said acid leaching; and then,
   combining said rinses and said acid leach prior to said gamma scanning of the removed fission products.

3. The method of claim 2, including the step of concentrating said combined rinses and leach to concentrate the removed fission products prior to said gamma scanning of the removed fission products.

* * * * *